Oct. 8, 1957     H. STEIGER     2,808,698

MECHANICAL REGULATOR FOR CLOCKWORK

Filed Aug. 17, 1954

INVENTOR

HERMANN STEIGER

By Young, Emery & Thompson

ATTYS.

2,808,698
Patented Oct. 8, 1957

2,808,698
MECHANICAL REGULATOR FOR CLOCKWORK

Hermann Steiger, Geneva, Switzerland

Application August 17, 1954, Serial No. 450,314

Claims priority, application Switzerland September 4, 1953

8 Claims. (Cl. 58—116)

The present invention has for object a mechanical regulator for clockworks which comprises a regulator wheel cooperating with a free oscillating system. Said mechanical regulator characterizes by the fact that said oscillating system is formed on the one hand by a principal oscillating system constituted by a spring inserted by one of its ends and on the other hand by an auxiliary oscillating system cooperating with the teeth of said regulator wheel and constituted by a prolongation of the free extremity of said inserted spring.

The attached drawing shows schematically and by way of example a form of execution of the regulator and some variants of execution of the oscillating unit.

Figure 1:
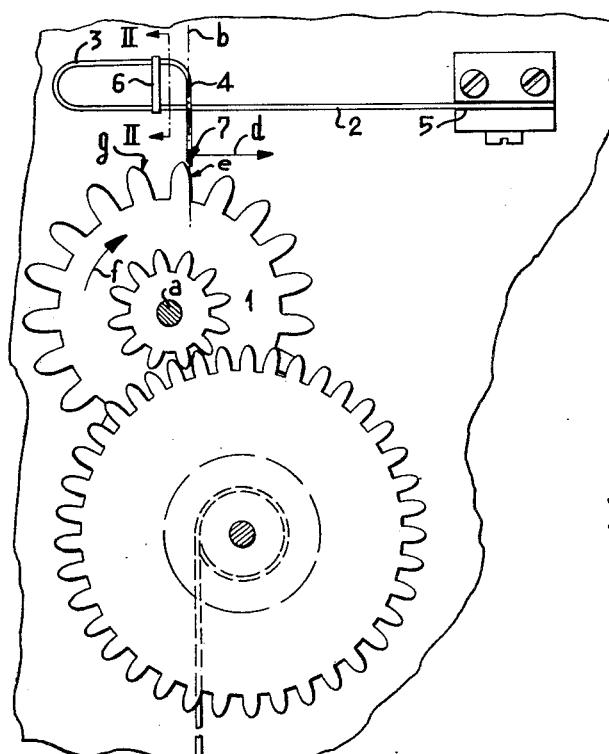
Fig. 1 is a side view of the regulator.
Figure 2:
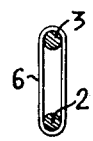
Fig. 2 is a cross section of the oscillating system along line II—II of Fig. 1.

According to Figs. 1 and 2 of the attached drawing, the regulator comprises a toothed regulator wheel 1 subjected to a couple tending to make it revolve in the direction of the arrow $f$.

Said wheel cooperates with an oscillating system formed by a rectilinear spring 2 inserted by one of its extremities and of which the other extremity is prolonged by a portion 3 forming a loop with said spring 2. Said loop carries a prolongation 4 located approximately in a plane $b$ parallel to the axis $a$ of rotation of said wheel 1 and perpendicular to the rectilinear spring 2. Besides, said plane $b$ is located between the footing 5 of the spring 2 and the extremity of said spring 2. Further, a ring 6 made of an elastic and supple material, such as rubber or a helical spring, is engaged on the two ends of the said loop 3 and exerts on said loop a force urging the two ends together. Finally, the extremity of the prolongation 4 presents an incline 7.

The working of the described regulator is as follows:

When a weight P, or another driving member, such as a spring barrel, actuates the wheel 1 in the direction of the arrow $f$, the teeth flanks of said wheel give impulses to the oscillating system by acting on the prolongation 4. It follows that said oscillating system is maintained in a reglular imposed oscillatory movement.

The study of said phenomenon has proved that the extremity of the prolongation 4 may come in contact with the flank $e$ of each tooth, of each second tooth or of each third tooth. The point of contact of the member 4 on the flank $e$ is a function of the amplitude of the oscillatory movement of the oscillating system. When said amplitude is little, the contact occurs in the vicinity of the summit of the tooth, on the contrary when the amplitude increases, said contact comes near again the foot of the tooth. In the moment in which the contact between the incline 7 and the contour of the head $g$ takes place, an exchange of forces between the wheel 1 and the oscillating system occurs which exchange keeps up the movement of said oscillating system and brakes the toothed wheel. Because of the curvature of the contour of the tooth, the resultant force acting on the member 4 is variable in size and direction according to the place where occurs the contact along the contour of the tooth. It follows, that the horizontal and vertical components of said resultant are also variable. If the contact happens near the extremity of the head $g$ of the tooth, the vertical component which is the force keeping up the movement of the principal oscillating system, i. e. spring 2, will be proportionally greater than if the contact occurs in the vicinity of the foot of the tooth. On the contrary, the horizontal component $d$ which is the force keeping up a vibratory movement of the auxiliary system, i. e. loop 3 and prolongation 4, will be proportionally weaker if the contact occurs in the vicinity of the summit of the head $g$ of the tooth and greater if the contact occurs in the vicinity of the foot of the tooth. It follows, that the tendency which presents such an oscillating system to increase the amplitude of its oscillatory movement when the driving force P increases, is cut down. Consequently, it is possible to ensure, in given limits, a constant amplitude to the oscillatory movement of the principal system, because the auxiliary oscillating system absorbs the excess of the driving force. One can, besides, increase said damping by using damping means such as a ring 6. The stability of the amplitude of the principal system ensure a working which is regular and practically independent of the driving couple of the wheel 1, at least for a driving couple which may vary from one to three times.

Figure 3:
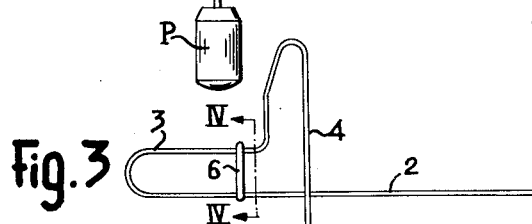
Figs. 3 and 4 are views in plan and cross section of a variant of the oscillating system.
Figure 4:
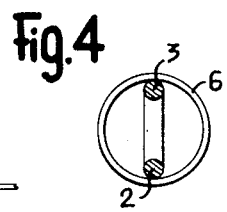

Figs. 3 and 4 show another form of the oscillating system, which has also given very good results. The elastic ring is constituted here by a circular ring made from steel which may distort elastically. Said ring may be closed, as illustrated on the drawing, or opened. It is clear that in the course of time the characteristics of such a damping device remain more constant and uniform than the characteristics of the damping device illustrated on Fig. 2.

Figure 5:
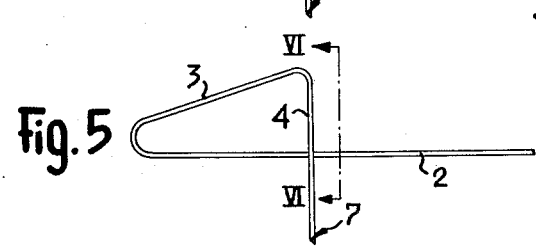
Figs. 5 and 6 are views in plan and cross section of another variant of the oscillating system.
Figure 6:
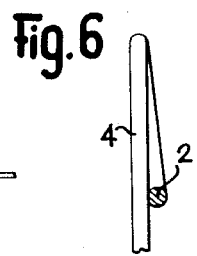

Figs. 5 and 6 show still another variant of the oscillating system in which the damping means are constituted by an initial tension given to the loop 3 and which tends to maintain the elastic member 4 on the free spring 2, meanwhile in the variants of Figs. 1 to 4 the member 4 does not come in contact with the spring 2.

It is clear that in all the described variants, the working of the regulator is the same, and that the regulated speed is essentially not a function of the driving couple, but a function on the one hand of the elastic characteristics of the oscillating system, and more particularly of the cross section and the free length of the spring 2 and on the other hand from the distance separating two successive teeth of the wheel 1.

On the contrary, the braking is given by the elastic characteristics of the prolongation 4 and by the inclination of the plane 7.

Said plane 7 may be approximately parallel to the spring 2 but its inclination may be modified according to required working conditions, until said plane may be approximately perpendicular to said spring 2.

The tests made with such a regulator have proved further that it is possible in given conditions to realize a satisfactory regulating effect by driving the wheel 1 in the reverse direction of the arrow $f$.

I claim:

1. In a mechanical motion regulator, a toothed motion wheel adapted to be subjected to a torque and a spring means associated therewith, said spring means comprising a main oscillating portion having one end fixed and having the other end formed into an elastic loop, and a secondary leaf portion extending from the loop and terminating in a free end; said free end cooperating with the teeth of said motion wheel.

2. The regulator of claim 1, said spring means being of uniform cross section.

3. The regulator of claim 2 in which said secondary portion is approximately perpendicular to said main portion.

4. The regulator of claim 3 in which said free end presents a plane inclined with respect to the axis of said secondary portion.

5. The regulator of claim 4 in which the secondary portion crosses said main portion nearer to the elastic loop than to the fixed end thereof.

6. The regulator of claim 2 and further comprising damping means for damping the vibrations of said secondary portion which are superposed on the oscillations of said main portion.

7. The regulator of claim 6, said damping means being constituted by an initial tension of said loop, said initial tension applying said secondary portion on said main portion.

8. The regulator of claim 6, said damping means comprising an elastic ring embracing spaced portions of said loop.

References Cited in the file of this patent

UNITED STATES PATENTS

| | | |
|---|---|---|
| 2,475,730 | Wandrey | July 12, 1949 |
| 2,654,214 | Steiger | Oct. 6, 1953 |